(No Model.)  2 Sheets—Sheet 1.

C. H. BEELER, Jr.
PARALLEL RULER.

No. 523,259.  Patented July 17, 1894.

WITNESSES
F. D. Goodwin.
William A. Barr.

INVENTOR
Charles H. Beeler Jr.
By his Attorneys
Howson & Howson

THE NORRIS PETERS CO., PHOTO-LITHO., WASHINGTON, D. C.

(No Model.) 2 Sheets—Sheet 2.
C. H. BEELER, Jr.
PARALLEL RULER.
No. 523,259. Patented July 17, 1894.
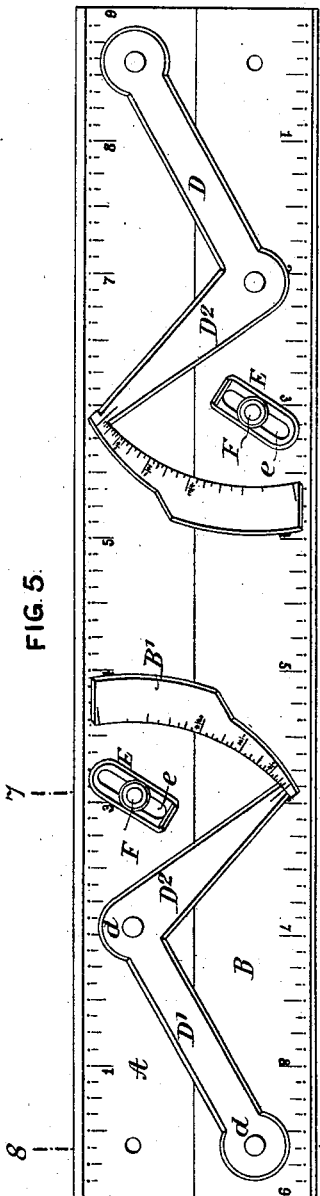
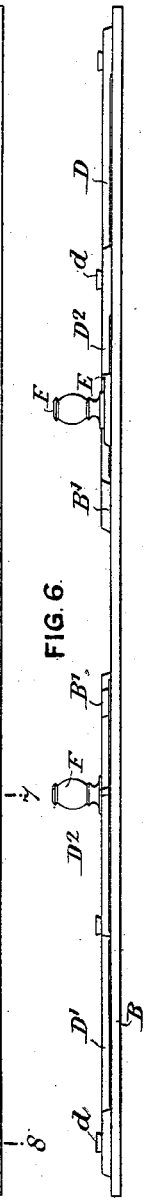
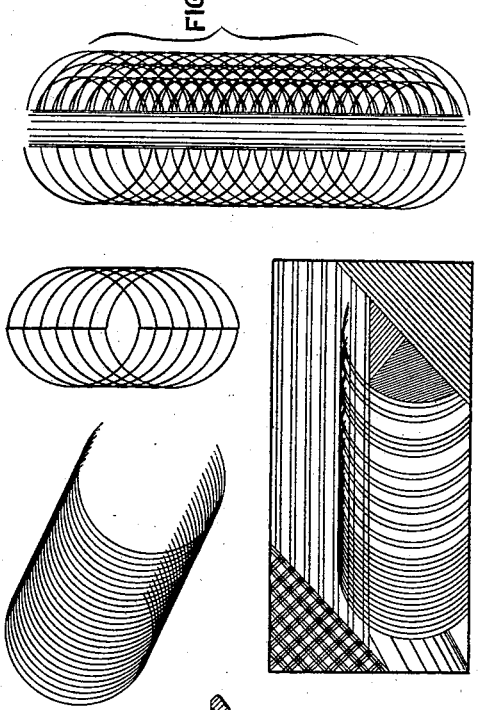
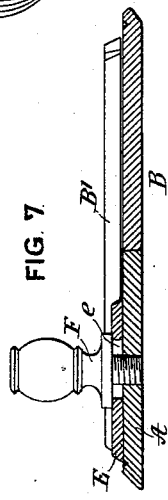
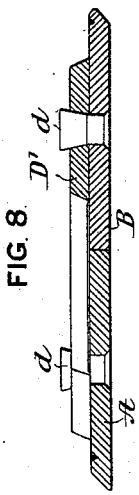
WITNESSES.
F. D. Goodwin.
William N. Barr.
INVENTOR
Charles H. Beeler Jr.
By his Attorneys
Howson & Howson

UNITED STATES PATENT OFFICE.

CHARLES H. BEELER, JR., OF PHILADELPHIA, PENNSYLVANIA, ASSIGNOR OF ONE-HALF TO GEORGE FREDERICK JORDAN, OF SAME PLACE.

PARALLEL-RULER.

SPECIFICATION forming part of Letters Patent No. 523,259, dated July 17, 1894.

Application filed December 29, 1893. Serial No. 495,035. (No model.)

*To all whom it may concern:*

Be it known that I, CHARLES H. BEELER, Jr., a citizen of the United States, residing in Philadelphia, Pennsylvania, have invented Improvements in Parallel-Rules, of which the following is a specification.

The object of my invention is to so construct a parallel rule that measurements can be accurately and quickly made and which can be used for section lining or for making numerous designs in imitation of engine turning and for mechanical drafting purposes in general, this object I attain in the following manner, reference being had to the accompanying drawings, in which—

Figure 1:
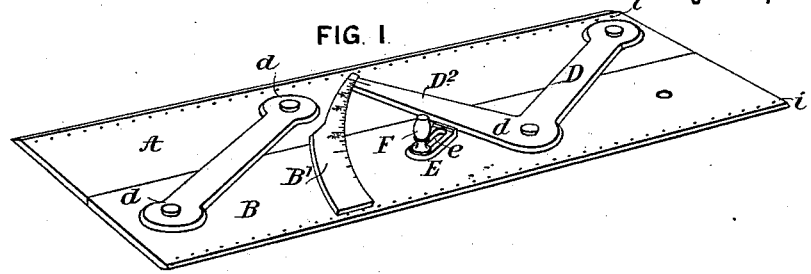
Figure 2:
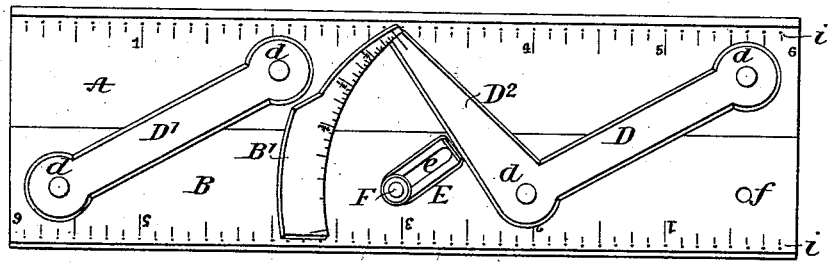
Figure 3:
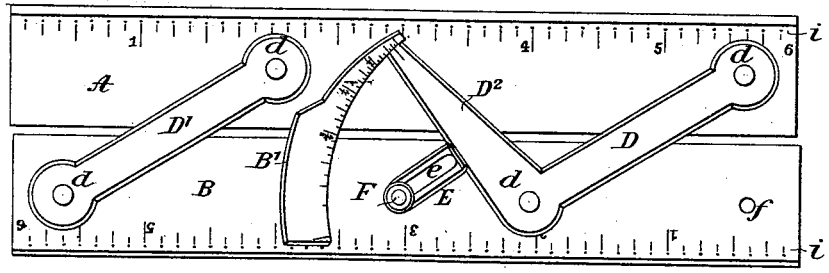
Figure 4:
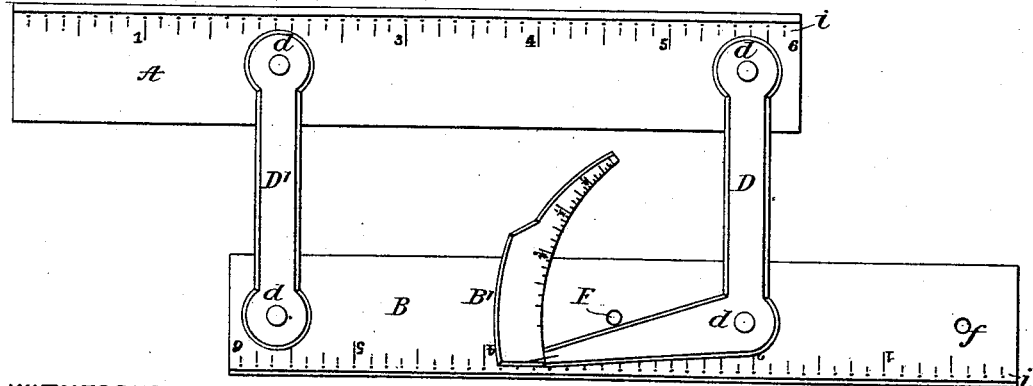

Figure 1, is a perspective view of my improved parallel rule. Fig. 2, is a plan view showing the rule closed. Fig. 3, is a plan view showing the rule partly opened. Fig. 4, is a plan view showing the rule full opened. Fig. 5, is a plan view showing a double rule. Fig. 6, is a side view of the rule shown in Fig. 5. Fig. 7, is a transverse sectional view on the line 7—7, Fig. 5. Fig. 8, is a transverse section on the line 8—8, Fig. 5. Fig. 9, is a view illustrating a series of designs made by the use of the rule.

A is one member of the rule and B is the other member, these members are connected together by links D D', which are secured to each member by pivots $d$, these pivots have tapered heads adapted to the tapered openings in the links, as clearly shown in Fig. 8, so that by striking the heads of the pivots, the lost motion caused by wear can be readily taken up without throwing the rule out of center.

Projecting from the end of the link D pivoted to the member B is an arm $D^2$, the end of which is beveled so as to rest under the beveled edge of the segment B' also secured to or forming part of the member B of the rule, this segment extends over the member A of the rule, as clearly shown in the drawings and is graduated in any manner required and on the arm $D^2$ is a line which when opposite any of the graduations will indicate corresponding openings of the rule, thus for instance if the member A is moved so that the arm will be in line with the one-sixteenth graduation, as in Fig. 3, the distance between the member A and the member B will be one-sixteenth of an inch, but if the member A is moved to the position shown in Fig. 4, with the arm $D^2$ in line with the one inch graduation then the distance between the members will be one inch.

It will be noticed that the distance between the graduations increases or multiplies as the rule is opened and thus very accurate work can be made owing to the fact that the spaces can be indicated clearly.

E is an adjustable stop through an elongated slot in which passes a set screw F, by screwing down which the stop can be fixed in an adjusted position on the member B; when this stop is not in use it can be secured on one end of the rule by screwing the set screw F into a screw threaded opening $f$, this stop is specially useful when the rule is used for section lining and by adjusting the stop to the width of space between lines required, as shown in Figs. 2 and 3, and by first manipulating one member and then the other, section lines can be made equi-distant apart.

I preferably arrange adjacent to one or both edges a series of center holes $i$ preferably arranged at a given distance apart, say for instance an eighth or a sixteenth of an inch apart, these center holes not only act as graduations of a rule but also as a center point for a compass, thus by centering the compass on the rule and moving the rule intermittently a series of circles can be made on an inclined line without drawing a line on the paper and by moving the compass from one center to another as well as moving one member of the rule other figures can be made.

The edges of the rule are beveled as shown in Figs. 7 and 8, one side being specially adapted for pencil and the other for pen. The under side of the links are cut away at the centers so as to reduce friction. The under side of the members of the rule may be also cut away for the same purpose. Thus by the above arrangement the rule is compact and can be cheaply manufactured and the wear of parts can be readily taken up and the rule can be utilized to make numerous designs in imitation of engine turning and can also be used to advantage in making mechanical drawings where accuracy is required, as the measurements may be made directly by the rule instead of by dividers or scales.

In Figs. 5 and 6, I have illustrated a rule in which the link D' is also provided with an arm aligning with a segment, the graduations on this segment may differ from the graduations on the segment B', for instance the sixty-fourth measurements may be marked on one segment and the thirty-second graduations on the other and one may be graduated to inches and the other to meters.

I claim as my invention—

1. The combination in a parallel rule, of the two members, links connecting the two members, one link having an arm, a segment on one of said members projecting over the other member and graduated, substantially as described.

2. The combination in a parallel rule, of the two members A and B, links connecting the two members together, an arm on one of said links, a segment fixed on one member and overhanging the other, with an adjustable stop for limiting the movement of the arms, substantially as described.

3. The combination in a parallel rule, of the two members A and B, links D, D', pivots $d$ for said links, an arm $D^2$ extending from the base of the link D at an angle to said link and having a beveled end, a graduated segment secured to or forming part of the portion B said segment overlapping the portion A and having an undercut edge adapted to receive the beveled end of the arm $D^2$, substantially as described.

In testimony whereof I have signed my name to this specification in the presence of two subscribing witnesses.

CHARLES H. BEELER, Jr.

Witnesses:
FRANK E. BECHTOLD,
JOSEPH H. KLEIN.